(12) United States Patent
Yamanashi et al.

(10) Patent No.: US 6,475,585 B1
(45) Date of Patent: Nov. 5, 2002

(54) RELEASABLE ADHESIVE ELEMENT HAVING IMAGE RECEPTION LAYER AND METHOD OF PRODUCING THE SAME

(75) Inventors: Hidetoshi Yamanashi, Tokyo (JP); Naoto Takada, Tokyo (JP); Hiroyuki Fujihara, Tokyo (JP); Katsuhiro Shiota, Tokyo (JP)

(73) Assignee: Teikoku Printing Inks Mfg. Co., LTD, Tokyo (JP)

( * ) Notice: Subject to any disclaimer, the term of this patent is extended or adjusted under 35 U.S.C. 154(b) by 0 days.

(21) Appl. No.: 09/162,771

(22) Filed: Sep. 30, 1998

(30) Foreign Application Priority Data

Oct. 21, 1997 (JP) .............................. 9-306425
Jan. 30, 1998 (JP) .............................. 10-019804
May 1, 1998 (JP) .............................. 10-122416

(51) Int. Cl.⁷ ................................. B32B 9/00
(52) U.S. Cl. ................. 428/40.1; 248/118.1; 248/346.1; 428/41.5; 428/41.6; 428/42.1; 428/143; 428/181; 428/327; 428/355; 428/412; 428/423.7; 522/92
(58) Field of Search ............................ 428/40.1, 355 N, 428/423.7, 412, 327, 143, 181, 41.5, 42.1, 40.2, 41.6; 522/92; 248/118.1, 346.1; 345/163

(56) References Cited

U.S. PATENT DOCUMENTS

| | | | |
|---|---|---|---|
| 4,501,783 A | * 2/1985 | Hiragami et al. | ............ 428/147 |
| 5,018,695 A | * 5/1991 | Bishop | ............ 248/346.1 |
| 5,149,592 A | * 9/1992 | Wojnarowicz | ............ 428/447 |
| 5,508,084 A | 4/1996 | Reeves et al. | ............ 428/172 |
| 5,700,851 A | * 12/1997 | Banning | ............ 523/161 |
| 5,721,086 A | * 2/1998 | Emslander | ............ 430/126 |

FOREIGN PATENT DOCUMENTS

| | | |
|---|---|---|
| DE | 93 08 039 | 9/1993 |
| EP | 0 624 854 A1 | 11/1994 |
| FR | 2 716 736 | 9/1995 |
| JP | 64-24794 | * 1/1989 |
| JP | 04055231 | * 9/1992 |
| JP | 8-294981 | 11/1996 |
| JP | 10-89342 | 4/1998 |

* cited by examiner

Primary Examiner—Nasser Ahmad
(74) Attorney, Agent, or Firm—Armstrong, Westerman & Hattori, LLP

(57) ABSTRACT

A releasable adhesive element (1) includes a white substrate (2) formed in a sheet-like shape. An image reception layer (4) containing particles is stacked on an obverse side of the substrate (2). An adhesive layer (5) is stacked on a reverse side of the substrate (2). The adhesive layer (5) is releasably covered with a release sheet (7). The image reception layer (4) enables an image to be formed thereon by an ink-jet printer, an electrophotographic printer, etc. The releasable adhesive element is usable as a mouse pad, a printed matter, etc.

4 Claims, 7 Drawing Sheets

RELEASABLE ADHESIVE ELEMENT HAVING IMAGE RECEPTION LAYER AND METHOD OF PRODUCING THE SAME

BACKGROUND OF THE INVENTION

The present invention relates to an adhesive element which is releasably adherable and which has on an obverse side thereof an image reception layer that enables a desired image to be formed thereon. The present invention also relates to a method of producing the adhesive element.

In general, printed matters such as photographs and posters are attached to wall surfaces or the like for the purpose of interior and exterior decoration or guide. Such printed matters are generally attached by using thumbtacks, pressure-sensitive adhesive tape, etc. or displayed by putting them in frames.

However, in a case where a printed matter is secured to a wall surface with thumbtacks or pressure-sensitive adhesive tape, it is difficult to change the position of the attached printed matter because holes are made in the wall surface by the thumbtacks or the wall surface is damaged when the pressure-sensitive adhesive tape is peeled off.

Under these circumstances, there has been a demand for a releasable adhesive element having on an obverse side thereof an image reception layer that enables an image to be formed thereon.

The present inventors proposed a novel mouse pad, which is used in an operation of inputting data to a computer, as a releasable adhesive element, in Japanese Patent Application Unexamined Publication Number [hereinafter referred to as "JP(A)"] 10-138696.

When a mouse is used on a desk having a small frictional resistance, the ball in the mouse may skid undesirably. In such a case, the amount of movement of the mouse cannot accurately be transmitted to the associated personal computer. Therefore, it is common practice to place on a desk a mouse pad having a predetermined frictional resistance at a surface thereof and to use a mouse on the mouse pad.

As shown in FIG. 12, a typical mouse pad is formed from a pad layer 81 of rigid polyvinyl chloride or the like and a thick foam layer 82 of expanded polyurethane or the like, which is provided on the reverse side of the pad layer 81. The surface of the pad layer 81 is provided with asperities 83 by embossing. Thus, a proper frictional surface is formed between the mouse and the mouse pad.

However, when a mouse is used on a mouse pad placed on a desk having a very small frictional resistance, the mouse pad itself may slide and move together with the mouse undesirably. In such a case, the amount of movement of the mouse cannot accurately be transmitted to the associated personal computer.

Accordingly, the previously proposed mouse pad has a frictional surface on an obverse side thereof and a releasable adhesive layer formed on a reverse side thereof, thereby preventing the undesired sliding on the top of a desk. We also proposed to provide on the adhesive layer side of the mouse pad an identification part containing identification information, such as characters, numerals, symbols or patterns, to make the mouse pad distinguishable from other commercial products. In the proposed mouse pad, however, because the identification part is provided on the adhesive layer side, the structure of the adhesive layer is restricted. Consequently, it is difficult to form a desired identification part, and it is impossible to provide a mouse pad having a desired image and exhibiting excellent design properties.

JP(A) 8-294981 and JP(A) 10-89342 propose a sucker-backed sheet that is made of a synthetic resin sheet having a poster retainer on an obverse side thereof and suckers formed on a reverse side thereof by screen printing or other similar method. However, such a sheet is merely designed to stick releasably. Therefore, the range of uses of the sheet is limited. Thus, it has heretofore been impossible to form an adhesive element that enables a desired image to be formed on an obverse side thereof and that is usable for many purposes.

An object of the present invention is to provide an adhesive element having an image reception layer on an obverse side thereof and a releasable adhesive layer on a reverse side thereof.

Another object of the present invention is to provide an adhesive element having a releasable adhesive layer and an image reception layer that enables a desired image to be formed thereon by an image forming device, e.g. an electrophotographic printer or an ink-jet printer, without forming a plate.

Still another object of the present invention is to provide a mouse pad having an image reception layer on an obverse side thereof and a releasable adhesive layer on a reverse side thereof. It should be noted that the term "mouse pad" as used in the present invention means a pad-shaped or mat-shaped member on which a mouse is moved for a computer input operation.

SUMMARY OF THE INVENTION

Figure 1:
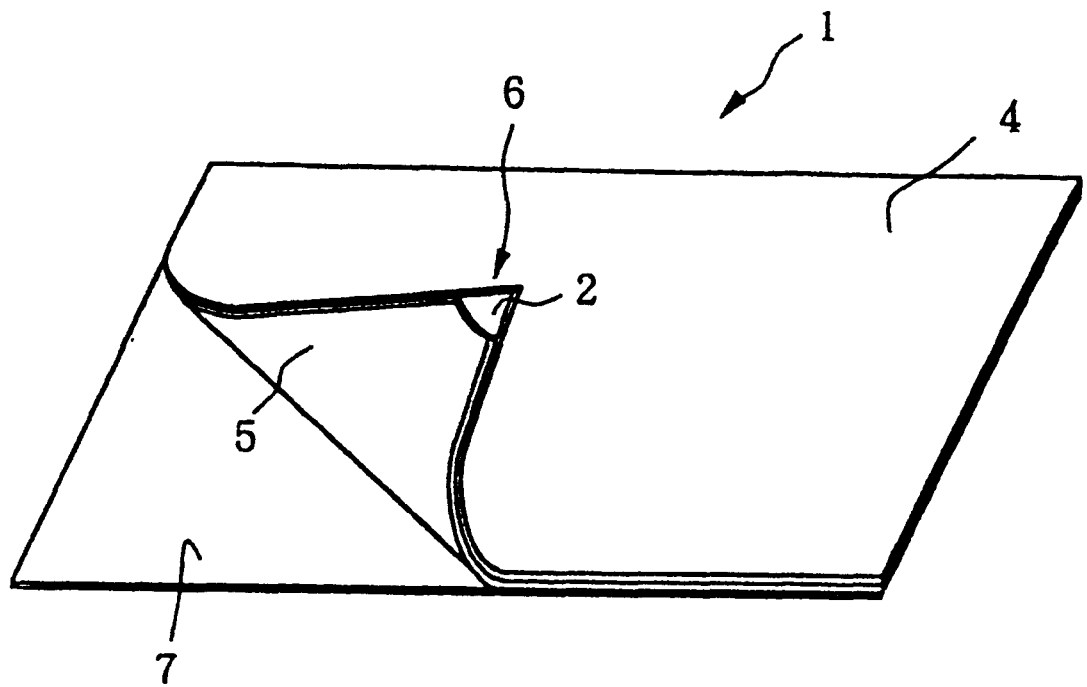
FIG. 1 is a diagram showing an adhesive element according to a first embodiment of the present invention.

The present invention is an adhesive element wherein a reception layer for receiving an image is formed on an obverse side of a substrate, and an adhesive part is formed on a reverse side of the substrate. The adhesive part is adapted to releasably adhere to an object to which the adhesive element is to be releasably stuck.

The reception layer may contain a particulate substance.

The particulate substance may be a globular particulate substance.

The globular particulate substance may be a polyurethane resin material.

The average particle diameter of the globular particulate substance is in the range of from 5 μm to 40 μm.

The reception layer may be formed from an ionizing radiation-curing synthetic resin composition.

The adhesive part may be formed from a releasable tacky layer or viscoelastic layer.

The releasable tacky layer or viscoelastic layer may have suckers adapted to adhere to a surface by creating a pressure difference.

The releasable tacky layer or viscoelastic layer may be formed over the whole or a part of the reverse side of the substrate.

The releasable tacky layer or viscoelastic layer may be formed by screen printing.

The releasable tacky layer or viscoelastic layer may be formed by curing an ionizing radiation-curing composition.

The ionizing radiation-curing composition may be a liquid composition containing a monofunctional monomer represented by the following formula 1 and a urethane acrylate oligomer.

Formula 1

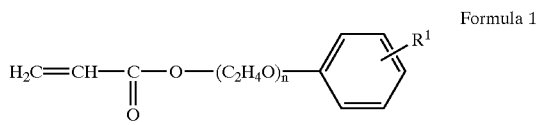

where n is an integer of from 1 to 5, and $R^1$ is a hydrocarbon residue having from 1 to 15 carbon atoms.

In formula 1, $R^1$ may be a hydrocarbon residue having from 6 to 9 carbon atoms.

The urethane acrylate oligomer may be a urethane diacrylate oligomer.

In addition, the present invention provides a mouse pad formed from an adhesive element having on an obverse side of a substrate an image reception layer that receives an image and, on a reverse side of the substrate, an adhesive part adapted to releasably adhere to an object to which the mouse pad is to be releasably stuck.

In addition, the present invention provides a printed matter wherein an image is formed on an image reception layer containing a particulate substance, which is provided on an obverse side of a substrate, and an adhesive part is formed on a reverse side of the substrate. The adhesive part is adapted to releasably adhere to an object to which the printed matter is to be releasably stuck.

The image on the image reception layer may be formed without using a printing plate.

DESCRIPTION OF THE PREFERRED EMBODIMENTS

The adhesive element according to the present invention has a reception layer formed on an obverse side of a substrate. The reception layer is adapted to receive ink, toner or the like and fix it thereon. The adhesive element further has an adhesive part formed on a reverse side of the substrate. The adhesive part is formed from a tacky layer or viscoelastic layer that is releasably adherable to an object to which the adhesive element is to be releasably stuck.

That is, because the obverse side of the substrate is provided with a reception layer that receives and fixes an image formed with ink, toner or the like, it is possible to print the substrate with ink. Accordingly, it is possible to receive and fix an ink image outputted from an ink-jet printer or a toner image outputted from an image forming device represented by a printer that forms an image by an electrophotographic method. Therefore, it is possible to obtain a printed matter formed with an image of a desired photograph, pattern, characters, etc. without making a printing plate.

In use of the adhesive element, the adhesive part formed on the reverse side of the substrate from a viscoelastic substance, i.e. a substance having both viscosity and elasticity, can be stuck fast to an object to which the adhesive element is to be attached, e.g. a window glass or the top of a desk. Furthermore, because the adhesive part is releasable, the adhesive element according to the present invention, which has a desired image formed thereon, is releasably stuck fast to the object.

Examples of materials usable for the substrate of the adhesive element according to the present invention are films or sheets of synthetic resin materials, such as a polyester resin, an acrylic resin, a polycarbonate resin, and a polyolefin resin, and thin metal films. The polyester resin film is excellent in mechanical strength, dimensional stability and thermal stability, and the acrylic resin film is excellent in transparency. Accordingly, it is necessary to select a material used for the substrate in relation to each particular use application of the adhesive element. The surface of the substrate may be subjected to a treatment for improving the adhesion of the substrate to a composition for forming the reception layer, e.g. corona discharge treatment, before the reception layer is formed.

In the adhesive element according to the present invention, the substrate may be colored as desired.

That is, because the substrate, which is formed with an image and to be stuck to an object, is colored, it is possible to set a background color for the image. Moreover, it is possible to prevent looming of the color or pattern of a desk to which the adhesive element is stuck, and also possible to prevent the image from being adversely affected by light from the rear side of a window glass.

A composition used to produce the reception layer is preferably selected in relation to a material used as the substrate. For example, if a polyester film is used as the substrate, it is preferable to use a polyester resin for the composition for forming the reception layer. If an acrylic film is used, a vinyl chloride-vinyl acetate copolymer is preferably used. By doing so, the substrate and the reception layer are bonded together even more firmly, and it is possible to form a reception layer of excellent characteristics.

It is preferable to select a reception layer forming composition that exhibits excellent receptivity to an image forming substance in relation to an image forming device used. For example, in the case of an ink-jet printer, which generally uses water-based ink, a composition having excellent receptivity to water-based ink is selected. In the case of an electrophotographic printer, which uses thermal fixing toner, it is important to select a composition exhibiting excellent receptivity to such toner when fixed by heat.

It is preferable to use a reception layer forming composition containing a component that can be set or cured through polymerization and crosslinking by ionizing radiation, e.g. ultraviolet radiation or electron radiation.

The use of an ionizing radiation-curing resin composition shortens the time required for the reception layer to fix onto the substrate and enhances the adhesion of the reception layer to the substrate. An ultraviolet-curing resin composition makes it possible to form a reception layer having high hardness and high mechanical strength and hence enables the reception layer to improve in the resistance to scuffing.

Examples of ionizing radiation-curing resin compositions are a composition blended with a water-soluble monomer and a composition blended with a water-insoluble monomer or a crosslinkable component in the form of a solution or an emulsion. Any of these compositions is usable in the production for obtaining an adhesive element having a reception layer according to the present invention.

Examples of water-soluble monomers set or cured by ionizing radiation are (meta)acrylic ester of a polyhydric alcohol, (meta)acrylic ester of N-alkylamino alcohol, polyethylene glycol (meta)acrylic ester, N-alkyl (meta)acrylic amide, and vinyl ether of a polyhydric alcohol. Examples of water-insoluble monomers are 1,6-hexanediol diacrylate, tripropylene glycol diacrylate, neopentyl glycol diacrylate, vinyl caprolactam, and 2-ethylhexyl acrylate. It should be noted that the term "(meta)acrylic" ester or amide means substances containing at least either of acrylic and methacrylic esters or amides.

The reception layer of the adhesive element according to the present invention is characterized by containing a particulate substance. There has been a conventional method in which a reception layer forming composition is mixed with a powder as a matting agent to effect dull-finishing of a printed image, for example. However, the particulate substance used in the present invention differs from the powder used in the conventional method in terms of the function thereof, the purpose of use and the intended effect.

The particulate substance to be contained in the reception layer of the adhesive element according to the present invention exhibits excellent reproducibility of an image formed by an image forming device, e.g. an electrophotographic printer or an ink-jet printer, and allows the surface of a film or sheet as a substrate to have fine asperities even after the image has been formed thereon. The particulate substance further has excellent wear resistance. Accordingly, even when the adhesive element is used as a mouse pad for an operation of inputting data to a computer, the mouse sliding surface will not wear, and the mouse pad can be used stably for a long period of time.

Furthermore, the reception layer in the present invention has light scattering properties enhanced by particles mixed therein and is therefore capable of obtaining a high-quality image for display even in an environment in which the adhesive element is illuminated from the rear side. It is particularly preferable to use globular particles for the purpose of the present invention. When the adhesive element is used as a mouse pad, globular particles allow the reception layer to manifest even smoother surface properties and to exhibit excellent light scattering properties.

The globular particles used in the present invention should preferably have a narrow distribution of particle diameters. It is possible to use particles of glass and resins such as silicone resin, urethane resin, nylon, polyolefin, and fluorine resin.

The use of these particles enables image forming characteristics to improve. In particular, urethane resin particles allow favorable mouse movement and minimize the wear of the mouse pad surface during the use of a mouse and further prevent the mouse pad surface from scuffing. Furthermore, it is possible to form an image of excellent color reproduction.

Globular particles usable in the present invention have a particle diameter in the range of from 5 $\mu$m to 40 $\mu$m, preferably from 20 $\mu$m to 30 $\mu$m. Globular particles generally known as "beads" can be used. Globular particles having a particle diameter less than 5 $\mu$m make no improvement in the quality of an image formed on the reception layer. Globular particles having a particle diameter larger than 40 $\mu$m produce unfavorably weak light scattering effect and large surface friction, causing the surface to scuff easily.

Regarding the amount of globular particles mixed in the reception layer forming composition, it is preferable to add globular particles in an amount of from 15% to 35% by weight of the composition. Properly adjusting the amount of globular particles mixed into the composition makes it possible to improve image forming characteristics such as the resolution, density and color reproduction of an image formed on the reception layer.

The thickness of the reception layer is in the range of from 5 $\mu$m to 100 $\mu$m, preferably from 10 $\mu$m to 80 $\mu$m By adjusting the thickness of the reception layer, light transmission and diffusion properties and image characteristics, etc. are changed and therefore can be properly adjusted according to each particular use application of the adhesive element.

It is possible to add to the reception layer forming composition a natural fiber powder, a protein powder or the like, which has an average particle diameter of the order of from 1 $\mu$m to 20 $\mu$m, in order to improve the receptivity to ink-jet printer ink without degrading the reception layer characteristics and the layer formability. It is also possible to blend a component which is conventionally added to a reception layer forming composition, e.g. a white pigment, a coloring agent, or a leveling agent.

The adhesive element according to the present invention has the function of releasably sticking to an object having a flat surface. The releasably sticking function may be provided by the tackiness of a substance that forms the tacky layer or viscoelastic layer, which forms the adhesive part. The releasably sticking function may also be provided by a synergic effect produced by the tackiness of a substance forming the tacky layer or viscoelastic layer and the action of suckers that adhere to a surface by creating a pressure difference through evacuation of the gas from hollows.

The adhesive part may be formed on the whole or part of the reverse side of the substrate.

To form a tacky layer or a viscoelastic layer, a resin material, e.g. a urethane resin, an epoxy resin, a silicone resin, or a vinyl chloride resin, is blended with a curing agent, a plasticizer, a solvent and other additives to adjust the flexibility, pliability and so forth, thereby preparing a composition capable of forming a hollow structure exhibiting the function of a sucker. The composition is coated by a method, for example, screen printing, to form a structure having a repeating unit of a hollow structure that exhibits the function of a sucker.

As a composition used to form a tacky layer or a viscoelastic layer, it is possible to use either a composition dissolved or dispersed in a solvent or an ionizing radiation-curing composition, e.g. an ultraviolet-curing composition. The use of an ultraviolet-curing composition makes it possible to form an adhesive part having excellent adhesion to the substrate and high mechanical strength. Examples of commercially available ultraviolet-curing ink compositions usable for this application are UVQVN-000 medium, UVQVN-70425 special medium, and QVN-000 medium, manufactured by Teikoku Ink Mfg. Co. Ltd.

If a substance exhibiting sufficiently good adhesive properties is used as a substance for forming a tacky layer or a viscoelastic layer, it is unnecessary to form hollows serving as suckers.

As an ultraviolet-curing composition that is cured by ultraviolet radiation to form a layer exhibiting releasable adhesive properties, it is preferable to use a liquid composition containing a urethane acrylate oligomer or urethane diacrylate oligomer having a weight-average molecular weight of from 1000 to 12000, preferably from 3000 to 10000, a monofunctional monomer, and a photo-initiator that generates active species upon irradiation with ultraviolet rays or the like that cause a polymerization reaction, a crosslinking reaction and a curing reaction to start.

Examples of monofunctional monomers usable in the present invention are given by the following formula 1.

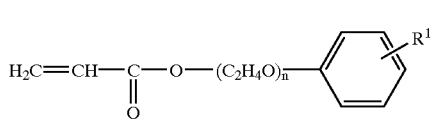

Formula 1 where n is an integer of from 1 to 5, and $R^1$ is a hydrocarbon residue having from 1 to 15 carbon atoms.

In compounds represented by formula 1, those which have as $R^1$ a hydrocarbon residue having from 6 to 9 carbon atoms are preferable. Specific examples of $R^1$ are a hexyl group, an octyl group, and a nonyl group.

Particularly, an adhesive element formed by using one of these compositions has the feature that it can be repeatedly stuck and peeled off a large number of times, and when the adhesive properties have degraded, the adhesive element is washed with a neutral detergent, thereby recovering its adhesive properties easily, and the adhesive element can manifest the capability of being repeatedly stuck and peeled off a large number of times.

In the adhesive element according to the present invention, it is preferable to protect the adhesive part until the adhesive element is actually used by releasably sticking paper or a synthetic resin film on the adhesive part. Paper or a synthetic resin film used for this purpose may be an ordinary product not subjected to surface treatment. It is also possible to use paper or a synthetic resin film having a release layer formed on the surface thereof.

The present invention will be described below by way of embodiments thereof.

1. First Embodiment

A first embodiment of the present invention will be described below with reference to the accompanying drawings. FIG. 1 shows an adhesive element 1 according to this embodiment. The adhesive element 1 has a photograph, pattern, characters, etc. printed on the surface thereof and is stuck to a window glass or the top of a desk.

Figure 2:
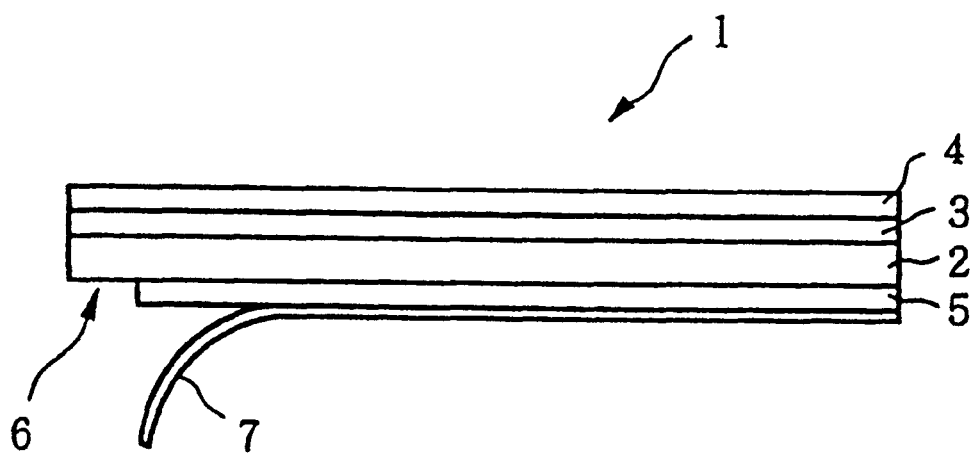
FIG. 2 is a sectional view of the adhesive element shown in FIG. 1.

As shown in the sectional view of FIG. 2, the adhesive element 1 includes a white substrate 2 formed in a rectangular sheet-like shape from vinyl chloride, polyester, polycarbonate, polypropylene, or polyurethane. A primer layer 3 is stacked on an obverse side of the substrate 2. A reception layer 4 is stacked on the primer layer 3. The adhesive element 1 further includes an adhesive layer 5 stacked on a reverse side of the substrate 2 as an adhesive part. The adhesive layer 5 is formed over the whole reverse side of the substrate 2, exclusive of a corner 6. The adhesive layer 5 is releasably covered with a release sheet 7. The adhesive element 1 has a thickness that allows it to be printed by a printer, e.g. an ink-jet printer.

The primer layer 3 enhances the adhesion between the substrate 2 and the reception layer 4. The primer layer 3 is formed by coating an ultraviolet-curing anchor ink containing a resin composition on the surface of the substrate 2 by screen printing or the like and then curing the coated anchor ink by ultraviolet radiation. An anchor ink usable in the present invention consists essentially of not more than 40 parts by weight of a coloring agent containing an extending pigment, from 12 to 20 parts by weight of a vinyl resin, from 18 to 30 parts by weight of a urethane diacrylate, from 18 to 30 parts by weight of an ether diacrylate, and from 12 to 20 parts by weight of a vinyl monomer.

A specific example of an anchor ink usable in the present invention has the following chemical composition:

| | |
|---|---|
| Coloring agent (Tipaque R930, i.e. titanium white pigment, manufactured by Ishihara Sangyo Kaisha, Ltd.) | 20 parts by weight |
| Vinyl chloride resin (Denka Vinyl 1000GK, manufactured by Electro Chemical Industry Co., Ltd.) | 15 parts by weight |
| Urethane diacrylate (Photomer 6210, manufactured by Sun Nopco) | 20 parts by weight |
| Ether diacrylate (tripropylene glycol diacrylate) | 20 parts by weight |
| Vinyl monomer (vinyl caprolactam) | 13 parts by weight |
| Photo-initiator (Irgacure 184, manufactured by Chiba Geigy) | 10 parts by weight |
| Silicone oil (Shinetsu Silicone KF96, manufactured by Shin-etsu Chemical Industry Co., Ltd.) | 2 parts by weight |

Not only ultraviolet-curing anchor inks but also heat-drying anchor inks are usable in the present invention. That is, it is possible to use an anchor ink containing from 5 to 10 parts by weight of cyclohexanone, from 10 to 20 parts by weight of an ester solvent, from 10 to 20 parts by weight of an aromatic hydrocarbon solvent, from 5 to 50 parts by weight of a coloring pigment containing an extending pigment, and from 20 to 45 parts by weight of an acrylic urethane resin.

A specific example of a heat-drying anchor ink usable in the present invention has the following chemical composition:

| | |
|---|---|
| Cyclohexanone | 5 parts by weight |
| Ester solvent (butyl Cellosolve acetate) | 10 parts by weight |
| Aromatic hydrocarbon solvent (Cactus Solvent P150, manufactured by Cactus Oil Co., Ltd.) | 10 parts by weight |
| Coloring pigment (Tipaque R670, i.e. titanium white pigment, manufactured by Ishihara Sangyo Kaisha, Ltd.) | 50 parts by weight |
| Polyester urethane resin (Estane 5515, manufactured by B.F. GOODRICH) | 23 parts by weight |
| Silicone oil (Shinetsu Silicone KF96, manufactured by Shinetsu Chemical Industry Co., Ltd.) | 2 parts by weight |

The reception layer 4, which is provided on the primer layer 3, is a layer that receives and fixes a water-based ink outputted from a printer, e.g. an ink-jet printer, to form an image thereon. More specifically, the reception layer 4 is formed by coating a reception layer forming composition containing a water-soluble and hydrophilic resin to the primer layer 3 by screen printing and then drying the coated composition by heating. A reception layer forming composition usable in the present invention contains from 10 to 20 parts by weight of a matting agent, from 3 to 8 parts by weight of a hydrophilic monomer, e.g. polyvinyl alcohol, from 10 to 20 parts by weight of a polyhydric alcohol, and from 50 to 70 parts by weight of water.

A specific example of a reception layer forming composition usable in the present invention has the following chemical composition:

| | |
|---|---|
| Matting agent (Sylysia 350, manufactured by Fuji Silysia Chemical (k.k.)) | 15 parts by weight |
| Polyvinyl alcohol | 5 parts by weight |
| Polyhydric alcohol (butyl acetate Carbitol) | 15 parts by weight |
| Silicone oil (TSA-73C, manufactured by Toshiba Silicone Co., Ltd.) | 5 parts by weight |
| Water | 60 parts by weight |

A reception layer forming composition having the above-described chemical composition uses a polyhydric alcohol as a slow-drying agent. Therefore, the rate of drying can be lowered in comparison to a case where water alone is used as a solvent. Accordingly, it is possible to prevent the occurrence of setting, clogging or other undesired phenomenon on the screen during the printing process. Moreover, the use of a polyhydric alcohol as a solvent allows the composition to mix with water easily. Furthermore, the reception layer forming composition is mixed with polyvinyl alcohol, which is a water-soluble and hydrophilic resin, and formed into a matrix resin to form the reception layer 4, thereby improving the reception layer 4 in the absorbing capacity to absorb water-based ink, more specifically, ink-jet printer ink, and also preventing blurring with ink.

Although in the above-described process of coating each composition, the anchor ink and the reception layer forming composition are coated by screen printing, it should be noted that the coating process may be carried out by a printing method in which the anchor ink and the reception layer forming composition are coated by using a roll coater or a knife coater, for example. Although a polyhydric alcohol is used as a slow-drying agent in the reception layer forming composition, an ether or an ester may also be used as a slow-drying agent.

Although in the above-described ultraviolet-curing anchor ink a vinyl monomer, a urethane diacrylate and an ether diacrylate are used as components of an ultraviolet-curing resin composition, other resin materials are also usable, provided that the selected materials have the function of improving the adhesion between the substrate 2 and the reception layer 4. For example, resins having an ultraviolet-curing reaction group can be used.

Although in the above-described heat-drying anchor ink an acrylic urethane resin is used as a component of a heat-drying resin composition, it is also possible to use other resin materials that have the function of improving the adhesion between the substrate 2 and the reception layer 4 as in the case of the above. Examples of usable resin materials are a polyvinyl chloride resin, polyester resin, acrylic resin, polyurethane resin, polyimide resin, diacetate resin, and polycarbonate resin.

Furthermore, although in the above-described composition polyvinyl alcohol is used as an example of a water-soluble and hydrophilic resin, it is also possible to use natural resin materials, e.g. casein and starch, and synthetic resin materials, e.g. carboxymethyl cellulose, hydroxyethyl cellulose, polyacrylamide, polyvinyl imidazole, polyethylene oxide, and polyamide.

In addition, although in the reception layer forming composition coating process, the reception layer forming composition is mixed with a water-soluble and hydrophilic resin to form the reception layer 4, the reception layer forming composition may be mixed with a hydrophilic extending pigment to form the reception layer 4. Specific examples of hydrophilic extending pigments usable in the present invention are synthetic silica powder, light-duty calcium carbonate, alumina silicate, natural or synthetic zeolite, kaolin clay, diatomaceous earth, titanium dioxide, and aluminum hydroxide. In this case, when the reception layer 4 is printed by using a color ink, the color development of the color ink can be improved.

The adhesive layer 5 is made of a viscoelastic substance, that is, a substance having both viscosity and elasticity, which allows the adhesive element 1 to be releasably stuck to an object. The adhesive layer 5 is formed as follows. An ultraviolet-curing composition for forming the adhesive layer 5 is coated uniformly by screen printing or the like and then fixed by irradiation with ultraviolet rays.

More specifically, an adhesive layer forming composition usable in the present invention contains from 30 to 60 parts by weight of a urethane oligomer, from 8 to 15 parts by weight of an epoxy monomer, from 25 to 30 parts by weight of an ester monomer, from 30 to 80 parts by weight of an acetophenone photo-initiator, from 3 to 8 parts by weight of acylphosphine oxide, from 1.0 to 10.0 parts by weight of an elastomer, from 1.0 to 30 parts by weight of an antifoaming agent containing no silicone, represented by an acrylic antifoaming agent, and 0.1 part by weight of a polymerization inhibitor.

A specific example of an adhesive layer forming composition useable in the present invention has the following chemical composition:

| | |
|---|---|
| Urethane oligomer (Photomer 6210, manufactured by Sun Nopco) | 50 parts by weight |
| Epoxy monomer (Aronix M-111, manufactured by Toa Gosei Chemical Industry Co., Ltd.) | 8 parts by weight |
| Ester monomer (tripropylene glycol diacrylate) | 25 parts by weight |
| Acetophenone photo-initiator (Darocure 1116, manufactured by Merck & Co., Inc.) | 6 parts by weight |
| Acylphosphine oxide | 4 parts by weight |
| Elastomer (Asaplene T431, manufactured by Asahi Chemical Industry Co., Ltd.) | 5 parts by weight |
| Antifoaming agent containing no silicone (BYK052, manufactured by Bic Chemy) | 2 parts by weight |
| Polymerization inhibitor (MQ, manufactured by Kawaguchi Chemical Industry Co., Ltd.) | 0.1 part by weight |

Although in the adhesive layer forming composition coating process the ultraviolet-curing adhesive layer forming composition is coated directly to the substrate 2 to form the adhesive layer 5, the process may be such that a primer layer is provided on the substrate 2 previously in accordance with the relation between the material of the substrate 2 and the adhesive layer forming composition for the purpose of enhancing the adhesion between the substrate 2 and the adhesive layer 5, and the adhesive layer forming composition is coated to the primer layer to form the adhesive layer 5.

In this embodiment, arranged as stated above, the adhesive element 1 has the reception layer 4 formed on the obverse side thereof to receive and fix ink thereon. Therefore, the substrate 2, which forms the adhesive element 1, can be printed with ink. The adhesive element 1 has a thickness that allows it to be printed by a printer, e.g. an ink-jet printer, and is also capable of receiving and fixing ink outputted from an ink-jet printer or the like. Accordingly, the obverse side of the adhesive element 1 can be color-printed with a desired photograph, pattern, characters, etc. at low cost by using an ink-jet printer or the like. Moreover, because the adhesive element 1, which is color-printed and to be releasably stuck to an object, is formed from a white substrate 2, it is possible to prevent looming of the color or pattern of an object to which the adhesive element 1 is stuck, and also possible to prevent the color print from being adversely affected by light from the rear side of a window glass. It is also possible to improve the color development of the color print. In use of the adhesive element 1, the adhesive part 5, which is formed uniformly on the reverse side of the substrate 2 from a viscoelastic substance, is stuck fast to an object, e.g. a window glass or the top of a desk. By doing so, the adhesive element 1 can be releasably stuck to the object.

Accordingly, if the obverse side of the substrate 2 is printed with a desired photograph or pattern edited on a personal computer or the like and the adhesive element 1 is stuck to a window glass or the wall surface of a refrigerator, the adhesive element 1, which is printed with a desired article, can be exhibited as a poster or a sticker. Furthermore, if the obverse side of the substrate 2 is printed with a pattern or characters formed by using a personal computer or the like, the adhesive element 1 can also be used as a label or a display panel. Accordingly, the adhesive element 1 is suitable for the production of display articles that are produced in small batches.

In addition, because the adhesive element 1 having a photograph printed on the obverse side thereof can be stuck fast to the top of a desk by the adhesive part 5, the area of the desk top can be used effectively. Furthermore, because a plurality of adhesive elements 1 can be printed differently from each other, it is possible to distinguish an adhesive element prepared by each individual person from those by others.

In a case where the substrate 2 of the adhesive element 1 is formed from a plastic material, it is difficult to form the reception layer 4 by printing a reception layer forming composition containing a water-soluble and hydrophilic resin directly on the plastic substrate 2. However, in the adhesive element 1 according to this embodiment, the obverse side of the substrate 2 is printed with an anchor ink containing a resin composition to form a primer layer 3, and thereafter, a reception layer 4 is formed on the primer layer 3. Therefore, the reception layer 4 can be stably formed on the substrate 2, and the adhesion of the reception layer 4 to the substrate 2 can be enhanced.

The primer layer 3 and the reception layer 4 are formed accurately at a predetermined position and uniformly over the whole surface by using printing technique. Accordingly, a reception layer 4 that is free from unevenness and suitable for printing with a printer or the like can be formed accurately at a predetermined position. The reception layer 4 can receive and fix even water-based ink, that is, ink outputted from an ink-jet printer. Therefore, a photograph, pattern, etc. can be printed on the reception layer 4 by an ink-jet printer. In printing using an ink-jet printer, in particular, the distance between the ink-jet print head and the printing surface must be kept constant because printing is effected by jetting out ink to the printing surface.

Even under these conditions, the reception layer 4 is suitable for printing by an ink-jet printer because the reception layer 4 is formed uniformly over the whole surface as stated above.

Ink-jet printers print by jetting out ink. Therefore, the print head does not contact the printing surface, and the printed matter is not heated to fix the ink. For this reason, an ink-jet printer is suitable for printing on the substrate 2, which is a thin sheet and hence readily affected by heat. Accordingly, it is desirable to effect printing on the substrate 2 by using a method that does not need thermal fixing, e.g. an ink-jet printer.

The adhesive element 1 is releasably stuck to an object by the adhesive layer 5, which is made of a viscoelastic substance. Therefore, the adhesive element 1 can be repeatedly stuck to and peeled from an object. Accordingly, it is unnecessary to use thumbtacks or a pressure-sensitive adhesive tape to secure the adhesive element 1, and it is also unnecessary to perform an operation of removing the pressure-sensitive adhesive from the object, which would otherwise be necessary to carry out after the pressure-sensitive adhesive tape has been peeled off. In addition, because thumbtacks are not needed to secure the adhesive element 1, no hole is made in the adhesive element 1. Moreover, there is no need for an operation of peeling a pressure-sensitive adhesive tape from the adhesive element 1 as needed when the adhesive element 1 is secured by using it. Thus, it is possible to prevent damage to the adhesive element 1.

The adhesive ink that forms the adhesive layer 5 is also coated by using printing technique. Therefore, the adhesive layer 5 can be formed uniformly and accurately at a predetermined position. Accordingly, the adhesion of the adhesive layer 5 to an object can be improved in comparison to a case where the adhesive layer 5 is not uniformly formed. Furthermore, because the adhesive layer forming composition is coated by screen printing, it can be coated thicker than in a case where it is coated by another printing method. When the adhesive layer 5 is thick, the adhesion of the adhesive layer 5 to an object can be increased by pressing the adhesive layer 5. Thus, because the adhesive power of the adhesive layer 5 can be enhanced, the holding power of the adhesive element 1 can be improved. In addition, the adhesive layer 5 is formed over the reverse side of the substrate 2, exclusive of the corner 6. Therefore, the adhesive element 1 can be readily peeled from an object by pulling the corner 6 of the adhesive element 1.

Furthermore, the adhesive element 1 is releasably provided with the release sheet 7, which covers the adhesive layer 5. Therefore, when the adhesive element 1 is shipped in a plastic bag, for example, the adhesive layer 5 of the adhesive element 1 can be prevented from undesirably sticking to the plastic bag. Accordingly, the efficiency of the shipping operation can be improved.

Although in the described embodiment the adhesive ink that forms the adhesive layer 5 is coated by screen printing, it may be coated by another printing method, e.g. gravure printing or flexographic printing. Alternatively, the adhesive layer forming composition may be coated by a printing method using a roll coater. In this case, an ester monomer or an ether monomer is added to the adhesive layer forming composition so that the coefficient of viscosity of the adhesive layer forming composition is in the range of from 1/100 to 1/10. Thus, coating of the adhesive layer forming composition to the substrate 2 can be performed at high speed. Accordingly, a large number of adhesive elements 1, each having the adhesive layer 5, can be produced in a short period of time. Thus, the production cost of the adhesive element 1 can be reduced.

Although in the described embodiment the adhesive layer 5 is formed by coating an ultraviolet-curing adhesive layer forming composition and then fixing the coated composition by ultraviolet radiation, the adhesive layer 5 may be formed as follows. A solvent-based adhesive layer forming composition containing a plasticizer is coated and then dried by heating to form a plasticized adhesive layer 5. A solvent-based adhesive layer forming composition usable in the present invention contains from 25 to 30 parts by weight of a thermoplastic resin, from 30 to 60 parts by weight of a ketone solvent, from 8 to 10 parts by weight of an aromatic solvent, and from 15 to 40 parts by weight of a plasticizer represented by dioctyl phthalate.

A specific example of a solvent-based adhesive layer forming composition usable in the present invention has the following chemical composition:

| | |
|---|---|
| Thermoplastic resin (Denka Vinyl 1000GK, manufactured by Electro Chemical Industry Co., Ltd.) | 27.5 parts by weight |
| Ketone solvent (cyclohexanone) | 45 parts by weight |
| Aromatic hydrocarbon solvent (Cactus Solvent P150, manufactured by Cactus Oil Co., Ltd.) | 9 parts by weight |
| Dioctyl phthalate | 17.5 parts by weight |
| Antifoaming agent containing no silicone (BYK052, manufactured by Bic Chemy) | 1 part by weight |

In this case, the adhesion can be enhanced by pressing the plasticized adhesive layer 5 against an object to which the adhesive element 1 is to be stuck. Therefore, the holding power with which the adhesive element 1 is secured to the object can be further enhanced.

To coat the solvent-based adhesive layer forming composition to the substrate 2 of the adhesive element 1 by another printing method, e.g. gravure or flexographic printing, or a printing method using a roll coater, a ketone or aromatic organic solvent is added to the solvent-based adhesive layer forming composition so that the coefficient of viscosity of the adhesive layer forming composition is in the range of from 1/100 to 1/10. When the solvent-based adhesive layer forming composition is coated by these printing methods, coating of the composition to the substrate 2 can be performed at high speed as in the case of the above. Thus, the production cost of the adhesive element 1 can be reduced.

Furthermore, the coating ink may be applied by pad printing, offset printing (letterpress offset printing or wet offset printing), or letterpress printing. It is also possible to perform emboss rolling after the application of the coating ink. Furthermore, it is also possible to use water-based coating ink.

2. Second Embodiment

Figure 3:
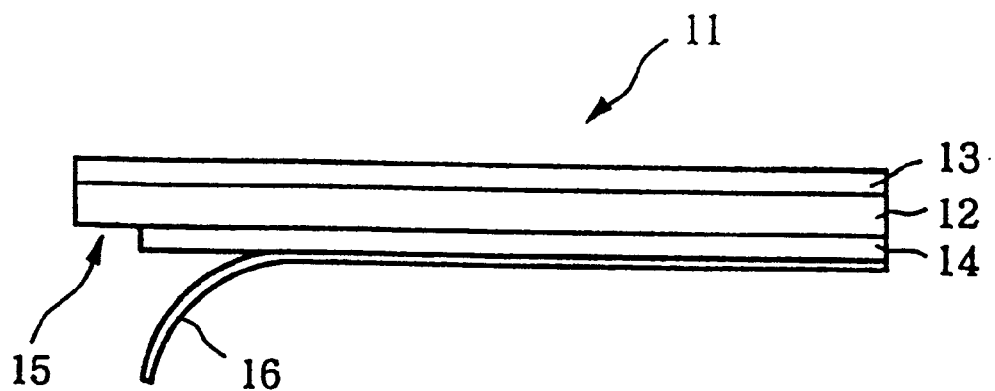
FIG. 3 is a sectional view of an adhesive element according to a second embodiment of the present invention.

FIG. 3 is a sectional view showing an adhesive element 11 according to a second embodiment of the present invention.

The adhesive element 11 will be described below with regard to only portions thereof in which the second embodiment is different from the first embodiment.

The adhesive element 11 includes a white substrate 12 formed in a sheet-like shape. A reception layer 13 is stacked directly on an obverse side of the substrate 12. The adhesive element 11 further includes an adhesive layer 14 stacked on a reverse side of the substrate 12 as an adhesive part. The adhesive layer 14 is formed uniformly over the whole reverse side of the substrate 12, exclusive of a corner 15. The adhesive layer 14 is releasably covered with a release sheet 16.

The reception layer 13 is a layer that receives and fixes ink or toner outputted from a printer, e.g. an ink-jet printer. The reception layer 13 is formed by screen-printing an ultraviolet-curing reception layer forming composition containing an ultraviolet-curing monomer and/or an ultraviolet-curing oligomer and then fixing the printed composition. More specifically, the ultraviolet-curing reception layer forming composition for forming the reception layer 13 is prepared by adding an ultraviolet-curing monomer and/or oligomer to the reception layer forming composition used in the first embodiment, which contains polyvinyl alcohol as a water-soluble hydrophilic resin. The ultraviolet-curing monomer and/or oligomer is mixed with the polyvinyl alcohol in the ratio of from 1:1 to 10:1. That is, assuming that the polyvinyl alcohol is (A) and the ultraviolet-curing monomer and/or oligomer is (B), the ratio of (A) to (B) is given by (A):(B)=from 1:1 to 1:10

The ultraviolet-curing reception layer forming composition, which contains polyvinyl alcohol as a water-soluble hydrophilic resin and an ultraviolet-curing monomer and/or oligomer, is formed into a matrix resin to form the reception layer 13, thereby improving the reception layer 13 in the absorbing capacity to absorb water-based ink, more specifically, ink-jet printer ink, and also preventing blurring with ink.

In this embodiment, arranged as stated above, the adhesive element 11 has the reception layer 13 for receiving and fixing ink. Therefore, the obverse side of the adhesive element 11 can be color-printed with a desired photograph, pattern, characters, etc. by using an ink-jet printer. Moreover, the adhesive element 11 can releasably stuck to an object by the adhesive layer 14 formed on the reverse side thereof. Accordingly, advantageous effects similar to those of the first embodiment can be obtained.

Because the reception layer 13 is formed from an ultraviolet-curing reception layer forming composition containing an ultraviolet-curing monomer and/or an ultraviolet-curing oligomer, the ultraviolet-curing reception layer forming composition is dried by irradiation with ultraviolet rays. Consequently, it is possible to shorten the time required for drying the composition. Thus, the production efficiency of the adhesive element 11 can be improved.

Furthermore, the formation of the reception layer 13 from an ultraviolet-curing reception layer forming composition makes it possible to improve the adhesion of the reception layer 13 to the plastic substrate 12 easily in comparison to a case where the reception layer 13 is formed by using a reception layer forming composition other than ultraviolet-curing compositions. Accordingly, it becomes unnecessary to provide a primer layer between the substrate 12 and the reception layer 13 as shown in the first embodiment. In addition, the use of an ultraviolet-curing reception layer forming composition makes it possible to improve the scuff resistance of the reception layer 13. Accordingly, the surface of the reception layer 13, which has the ink receiving function, need not be covered with a protective layer. Thus, the production efficiency is improved, and the need for the above-described primer layer and protective layer is eliminated. Consequently, the production cost can be reduced.

Although in the above-described first and second embodiments the adhesive element 1 (11) is printed with a photograph, pattern, etc. by using an ink-jet printer, it should be noted that the printer usable in the present invention is not necessarily limited to the ink-jet printer. For example, a thermal transfer printer or an electrophotographic printer may also be used for printing.

Although in the above-described first and second embodiments a background color for printing is set by using the white substrate 2 (12) by way of example, it should be noted that when a colorless, transparent substrate is used, the background color may be set by stacking a colored layer on the obverse or reverse side of the substrate.

3. Third Embodiment

A third embodiment of the present invention wilt be described below with reference to FIG. 4.

Figure 4:
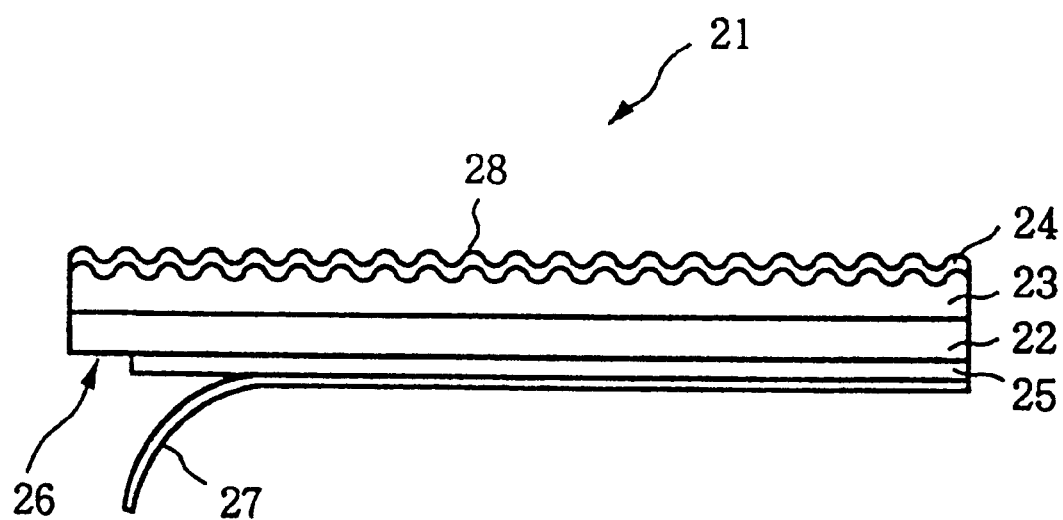
FIG. 4 is a sectional view of a mouse pad as one example of application of an adhesive element according to a third embodiment of the present invention.

FIG. 4 is a sectional view showing a mouse pad 21 as one example of application of an adhesive element according to this embodiment. The third embodiment will be described below with regard to only portions thereof in which the embodiment differs from the second embodiment.

The mouse pad 21 includes a white substrate 22 formed in a sheet-like shape. A rough layer 23 is stacked on an obverse side of the substrate 22. A reception layer 24 is stacked on the rough layer 23. The mouse pad 21 further includes an adhesive layer 25 stacked on a reverse side of the substrate 22 as an adhesive part. The adhesive layer 25 is formed uniformly over the reverse side of the substrate 22, exclusive of a corner 26. The adhesive layer 25 is releasably covered with a release sheet 27.

The rough layer 23 is formed as follows. An ultraviolet-curing reception layer forming composition containing globular particles, i.e. beads, is coated uniformly by screen printing. Thereafter, the coated composition is fixed by irradiation with ultraviolet rays to form the rough layer 23. The reception layer 24 stacked on the rough layer 23 has a frictional surface 28 having asperities formed by the beads. The frictional surface 28 contacts a ball provided in the bottom of a mouse and allows the ball to roll thereon when the mouse is operated.

More specifically, a bead-containing, reception layer forming composition usable in the present invention contains from 20 to 25 parts by weight of urethane beads, from 25 to 30 parts by weight of a urethane acrylate, from 10 to 15 parts by weight of a polyester acrylate, from 35 to 40 parts by weight of an aliphatic monofunctional monomer, from 2 to 5 parts by weight of an acetophenone photo-initiator, from 1 to 2 parts by weight of a silicone oil, from 0.05 to 0.1 part by weight of a polymerization inhibitor, and from 1 to 3 parts by weight of an inorganic anti-fungus agent.

A specific example of a bead-containing, reception layer forming composition usable in the present invention has the following chemical composition:

| | |
|---|---|
| Urethane beads | 20 parts by weight |
| Urethane acrylate (Ebecryl 285, manufactured by Daicel UCB) | 30 parts by weight |
| Polyester monomer (Aronix M-9050, manufactured by Toa Gosei Chemical Industry Co., Ltd.) | 15 parts by weight |
| Aliphatic monofunctional monomer (2-ethylhexyl acrylate) | 25 parts by weight |
| Acetophenone photo-initiator (Darocure 1116, manufactured by Merck & Co., Inc.) | 5 parts by weight |
| Silicone oil (Shinetsu Silicone KF96; manufactured by Shin-etsu Chemical Industry Co., Ltd.) | 2 parts by weight |
| Polymerization inhibitor (MQ, manufactured by Kawaguchi Chemical Industry Co., Ltd.) | 0.1 part by weight |
| Inorganic anti-fungus agent (zeolite) | 3 parts by weight |

In this embodiment, arranged as stated above, the mouse pad 21 has the reception layer 24, which receives and fixes ink. Therefore, the mouse pad 21 can be printed with a desired photograph, pattern, characters, etc. by using an ink-jet printer. Accordingly, a desired mouse pad 21 can be produced easily. Thus, the prints on the obverse sides of a plurality of mouse pads 21 can be made different from each other. Therefore, one's particular mouse pad 21 can be distinguished and discriminated from mouse pads 21 used by others.

In the case of the mouse pad 21 according to this embodiment, the adhesive layer 25 provided on the reverse side thereof can be stuck fast to the top of a desk. Accordingly, even when the mouse pad 21 is placed on the top of a desk that is smooth because of a very small frictional resistance, there is no likelihood that the mouse pad 21 may slide undesirably when a mouse is moved thereon, as experienced with conventional mouse pads. Accordingly, the amount of movement of the mouse can be accurately transmitted to the associated personal computer.

In the mouse pad 21 according to this embodiment, an adhesive layer 25 of a viscoelastic substance is formed on a sheet-shaped substrate 22. Accordingly, the mouse pad 21 can be secured to the top of a desk. Therefore, it is unnecessary to provide a thick urethane foam layer on a rigid polyvinyl chloride substrate, as is the conventional practice.

In addition, the frictional surface 28 can be formed on the obverse side of the mouse pad 21 simply by coating and fixing a reception layer forming composition containing beads on the substrate 22 of the mouse pad 21. Therefore, the substrate 22 need not be formed thick in comparison to the prior art in which the substrate needs to be embossed to form an embossed configuration on a surface thereof. Consequently, the mouse pad 21 can be formed thin, so that even when a part of a keyboard as used in combination with a mouse is placed on the mouse pad 21, the keyboard is prevented from tilting, and it is possible to prevent misoperation of the keyboard, which might otherwise occur owing to the tilt of the keyboard.

On the other hand, the frictional surface 28, which is formed by the rough layer 23 containing globular particles, i.e. beads, makes it possible to enhance the scuff resistance of the obverse side of the substrate 22, which is contacted by a mouse, and hence possible to protect the substrate 22 from scuffing. Accordingly, a scuff-resistant mouse pad can be formed. Furthermore, because the rough layer 23 is formed from a bead-containing, reception layer forming composition, which contains an inorganic anti-fungus agent, an antifungal frictional surface 28 can be formed. Accordingly, the beads not only form asperities but also make it possible to keep the frictional surface 28 hygienic, which the user's hand is likely to touch when operating a mouse, and to which dirt and fungi are likely to adhere.

Although in the above-described embodiment the rough layer 23 is formed on the obverse side of the substrate 22 by printing a bead-containing, reception layer forming composition by way of example, it is also possible to use a substrate 22 having a rough surface with fine asperities formed by sandblasting the obverse side of the substrate 22, for example. The use of such a substrate 22 makes it possible to eliminate the process of forming the rough layer 23 by printing the bead-containing, reception layer forming composition.

4. Fourth Embodiment

Figure 5:
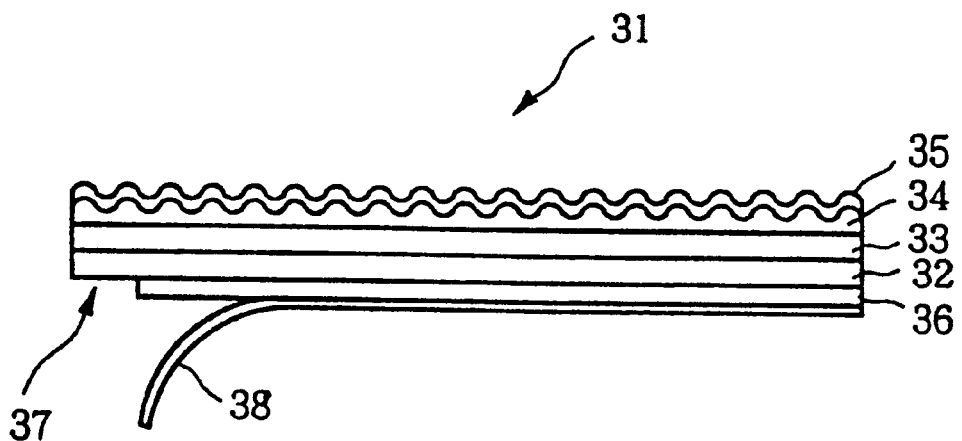
FIG. 5 is a sectional view of an adhesive element according to a fourth embodiment of the present invention.

FIG. 5 is a sectional view showing a mouse pad 31 as one example of application of an adhesive element according to a fourth embodiment of the present invention. The mouse pad 31 will be described below with regard to only portions thereof in which this embodiment differs from the third embodiment.

The mouse pad 31 includes a colorless, transparent substrate 32 formed in a sheet-like shape. A white colored layer 33 is stacked on an obverse side of the substrate 32. A rough layer 34 is stacked on the colored layer 33. A reception layer 35 is stacked on the rough layer 34. The mouse pad 31 further includes an adhesive layer 36 stacked on a reverse side of the substrate 32 as an adhesive part. The adhesive layer 36 is formed uniformly over the whole reverse side of the substrate 32, exclusive of a corner 37. The adhesive layer 36 is releasably covered with a release sheet 38.

The colored layer 33 is formed by applying white color ink uniformly to the whole obverse side of the substrate 32 by screen printing and then fixing the applied ink. Thus, the substrate 32 is colored in white.

In this embodiment, arranged as stated above, a white colored layer 33 is provided on the obverse side of the colorless, transparent substrate 32. The colored layer 33 makes it possible to set a background color for print formed on the obverse side of the mouse pad 31. In this embodiment, in particular, the substrate 32 is colored in white; therefore, the color development of the print can be improved. In addition, because transmission of light through the substrate 32 is blocked, it is possible to prevent looming of the color or pattern of a desk on which the mouse pad 31 is placed, which would otherwise affect the print adversely. Accordingly, it is possible to use an existing transparent film, which is generally used as a substrate, and the production cost can be reduced.

Although in the above-described embodiment the colored layer 33 is stacked on the obverse side of the substrate 32 by way of example, it may be stacked on the reverse side of the substrate 32. In such a case also, similar advantageous effects can be obtained. The color of the colored layer 33 is not necessarily limited to white.

5. Fifth Embodiment

Figure 6:
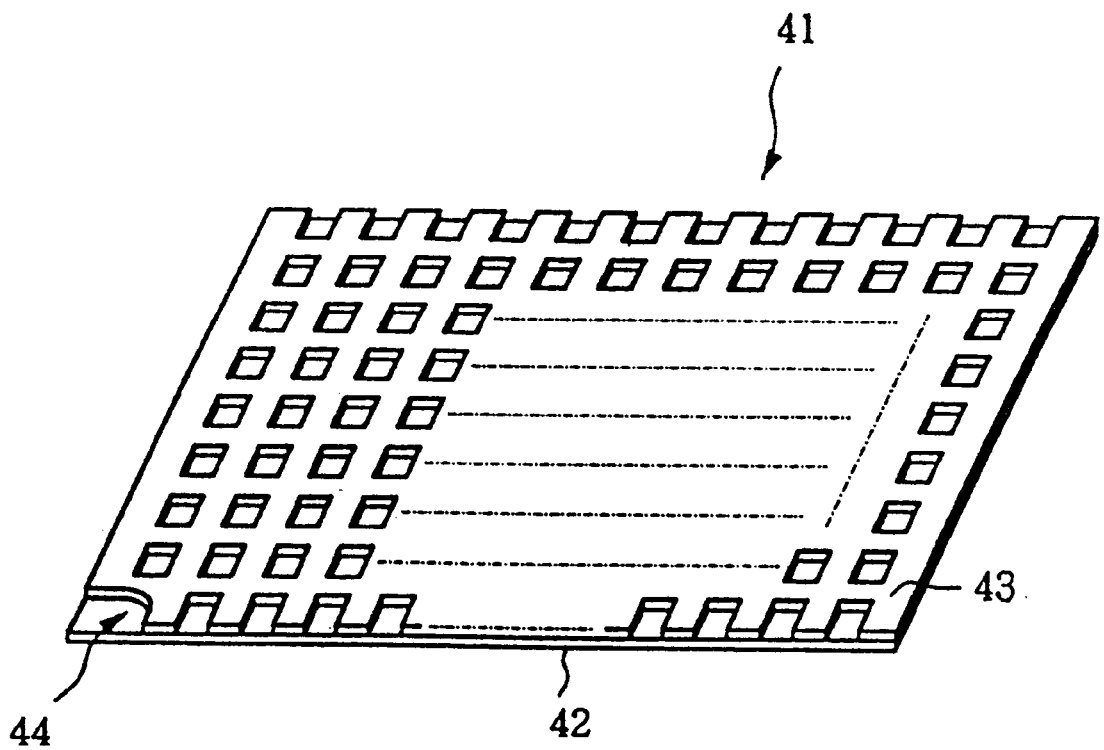
FIG. 6 is a diagram illustrating an adhesive element according to a fifth embodiment of the present invention.

FIG. 6 is a diagram showing the bottom of a mouse pad 41 as one example of application of an adhesive element according to a fifth embodiment of the present invention. The mouse pad 41 will be described below with regard to only portions thereof in which this embodiment differs from the third embodiment. It should be noted that FIG. 6 shows the mouse pad 41 in a state where a release sheet as shown in the third embodiment has been peeled off.

The mouse pad 41 has a substrate 42. The substrate 42 has an adhesive part 43 formed on the bottom thereof in a lattice shape from the above-described viscoelastic substance. The adhesive part 43 is formed through a coating step where the above-described adhesive layer forming composition is coated on the bottom of the substrate 42, and a fixing step where the adhesive layer forming composition is fixed. The coating step is a process in which the bottom of the substrate 42, exclusive of a corner 44, is coated with the above-described ultraviolet-curing, solvent-based or water-based adhesive ink in a lattice shape by a printing method, e.g. gravure, flexography, pad printing, offset printing (letterpress offset printing or wet offset printing), or letterpress printing, or a printing method using a roll coater or an emboss roll. The fixing step is a process in which the adhesive layer forming composition is fixed by irradiation with ultraviolet rays or heat-drying.

In this embodiment, arranged as stated above, the bottom of the mouse pad 41, which is coated with the adhesive layer forming composition, is provided with a viscoelastic adhesive part 43 in a lattice shape. Therefore, the mouse pad 41 can be stuck fast to the top of a desk by the adhesion of the adhesive part 43 and is also capable of being peeled off, as in the case of the first embodiment. Accordingly, advantageous effects similar to those of the third embodiment can be obtained. Furthermore, because the lattice-shaped adhesive part 43 is formed by coating an adhesive layer forming composition in a lattice shape, the amount of the adhesive layer forming composition used to form the adhesive part 43 can be reduced in comparison to a case where the adhesive layer forming composition is coated uniformly over the whole bottom of the substrate 42, exclusive of the corner 44. Thus, it is possible to provide a low-cost mouse pad 41.

6. Sixth Embodiment

Figure 7:
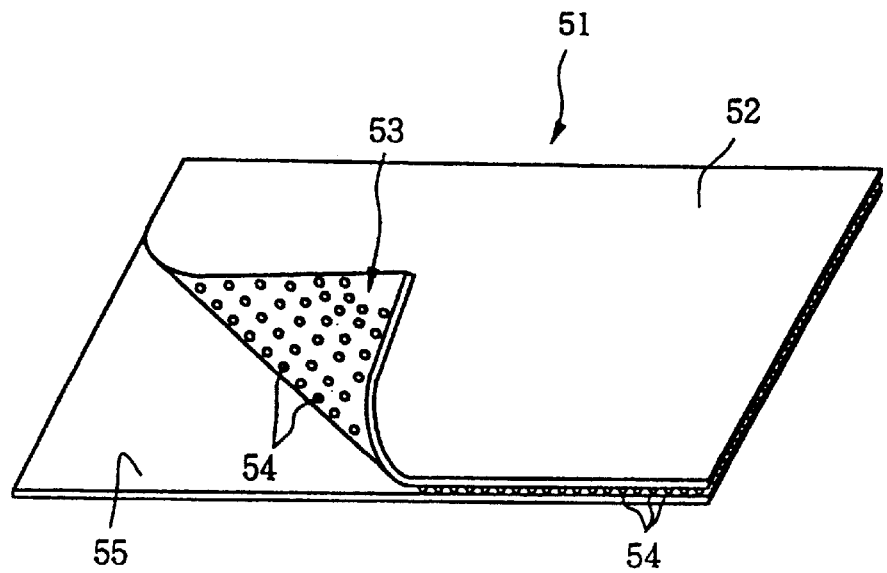
FIG. 7 is a diagram illustrating a mouse pad as one example of application of an adhesive element according to a sixth embodiment of the present invention.

FIG. 7 shows a sixth embodiment of the present invention. This embodiment will be described below with regard to only portions thereof in which the embodiment differs from the third embodiment.

A mouse pad 51 as one example of application of an adhesive element according to this embodiment has a substrate 52. The substrate 52 has a plurality of dot-shaped adhesive parts 54 formed on the whole reverse side of the substrate 52, exclusive of a corner 53, from the above-described viscoelastic substance. The adhesive parts 54 are releasably covered with a release sheet 55. The adhesive parts 54 are formed as follows. The reverse side of the substrate 52 is coated with the above-described ultraviolet-curing, solvent-based or water-based adhesive layer forming composition in a dot pattern by a printing method, e.g. screen printing, gravure, flexography, pad printing, offset printing (letterpress offset printing or wet offset printing), or letterpress printing, or a printing method using a roll coater or an emboss roll. Thereafter, the adhesive layer forming composition is fixed by irradiation with ultraviolet rays or heat-drying.

In this embodiment, arranged as stated above, the reverse side of the substrate 52, which is-coated with the adhesive ink, is provided with viscoelastic adhesive parts 54 in a dot pattern. Therefore, the mouse pad 51 can be releasably stuck fast to the top of a desk by the adhesion of the adhesive parts 54, as in the case of the third embodiment. Accordingly, advantageous effects similar to those of the third embodiment can be obtained.

Furthermore, because the dot-shaped adhesive parts 54 are formed by coating an adhesive layer forming composition in a dot pattern, the mouse pad 51 can be peeled from the desk more easily than in a case where the viscoelastic substance is formed uniformly over the whole reverse side of the substrate 52. Moreover, the amount of the adhesive layer forming composition used can be reduced in comparison to a case where the adhesive layer forming composition is coated uniformly over the whole reverse side of the substrate 52, exclusive of the corner 53. Accordingly, the mouse pad 51 can be provided at reduced cost.

7. Seventh Embodiment

Figure 8:
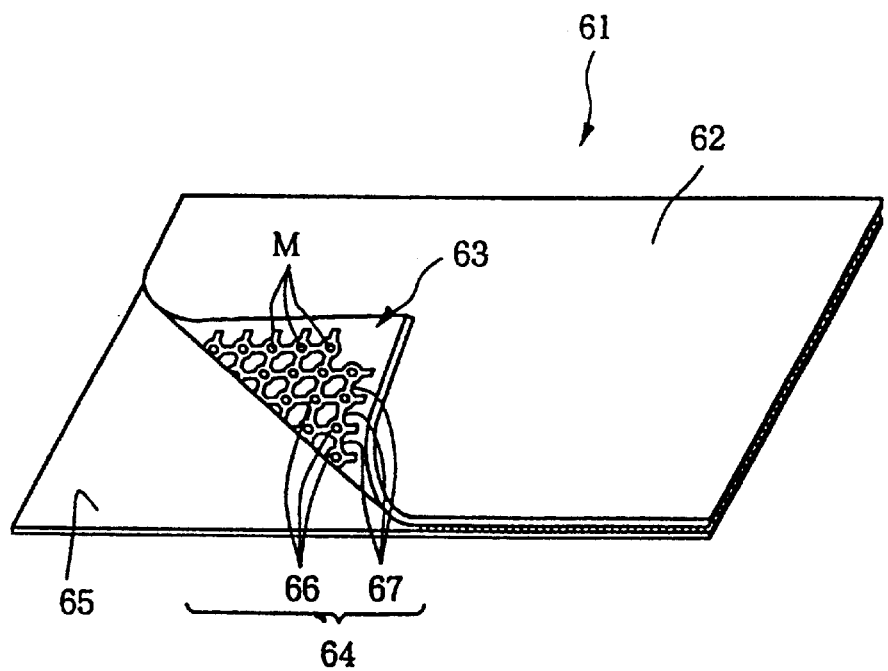
FIG. 8 is a diagram illustrating an adhesive element according to a seventh embodiment of the present invention.

FIG. 8 is a diagram showing a seventh embodiment of the present invention. This embodiment will be described below with regard to only portions thereof in which the embodiment differs from the third embodiment.

A mouse pad 61 as one example of application of an adhesive element according to this embodiment has an adhesive part 64 formed on the reverse side of a substrate 62, exclusive of a corner 63. The adhesive part 64 is releasably covered with a release sheet 65. The adhesive part 64 comprises a plurality of sucker portions 66, each formed in an annular shape from the above-described viscoelastic substance, and a plurality of connecting portions 67 made of the above-described viscoelastic substance so as to connect the sucker portions 66 to each other. The adhesive part 64 is formed as follows. The reverse side of the substrate 62 is coated with the above-described ultraviolet-curing, solvent-based or water-based coating ink by a printing method, e.g. screen printing, gravure, flexography, pad printing, offset printing (letterpress offset printing or wet offset printing), or letterpress printing, or a printing method using a roll coater or an emboss roll. Thereafter, the coated ink is fixed by irradiation with ultraviolet rays or heat-drying.

In this embodiment, arranged as stated above, the mouse pad 61 can be stuck fast to the top of a desk by a combination of the adhesive power of the adhesive part 64, which is made of a viscoelastic substance, and the suction force produced by the reduction in the pressure in hermetic chambers M surrounded with the sucker portions 66, respectively, which are formed when the sucker portions 66 are stuck fast to the top of the desk. Accordingly, the material cost of forming the adhesive part 64 can be reduced in comparison to a case where the viscoelastic substance is coated uniformly over the whole reverse side of the substrate 62. Moreover, it is possible to increase the holding power in comparison to a case where the viscoelastic substance is coated in a dot pattern as in the sixth embodiment. Accordingly, a mouse pad 61 having excellent holding power can be provided at reduced cost.

The adhesive part 64 of the mouse pad 61 is peeled from the desk by pulling the corner 63. At this time, the suction force produced by the hermetic chambers M, which are surrounded with the sucker portions 66, can be made to disappear by allowing the air to enter the hermetic chambers M. Accordingly, the mouse pad 61 can be peeled from the desk more easily than in a case where the viscoelastic substance is coated uniformly over the whole reverse side of the substrate 62.

Although in the above-described embodiment circular sucker portions 66 are formed on the substrate 62 from a viscoelastic substance by way of example, it should be noted that the shape of each sucker portion 66 is not necessarily limited to the circular shape. The sucker portions 66 may have any shape, for example, an elliptical shape, a polygonal shape, or a polygonal shape with rounded vertices, provided that hermetic chambers can be formed by the sucker portions.

8. Eighth Embodiment

Figure 9:
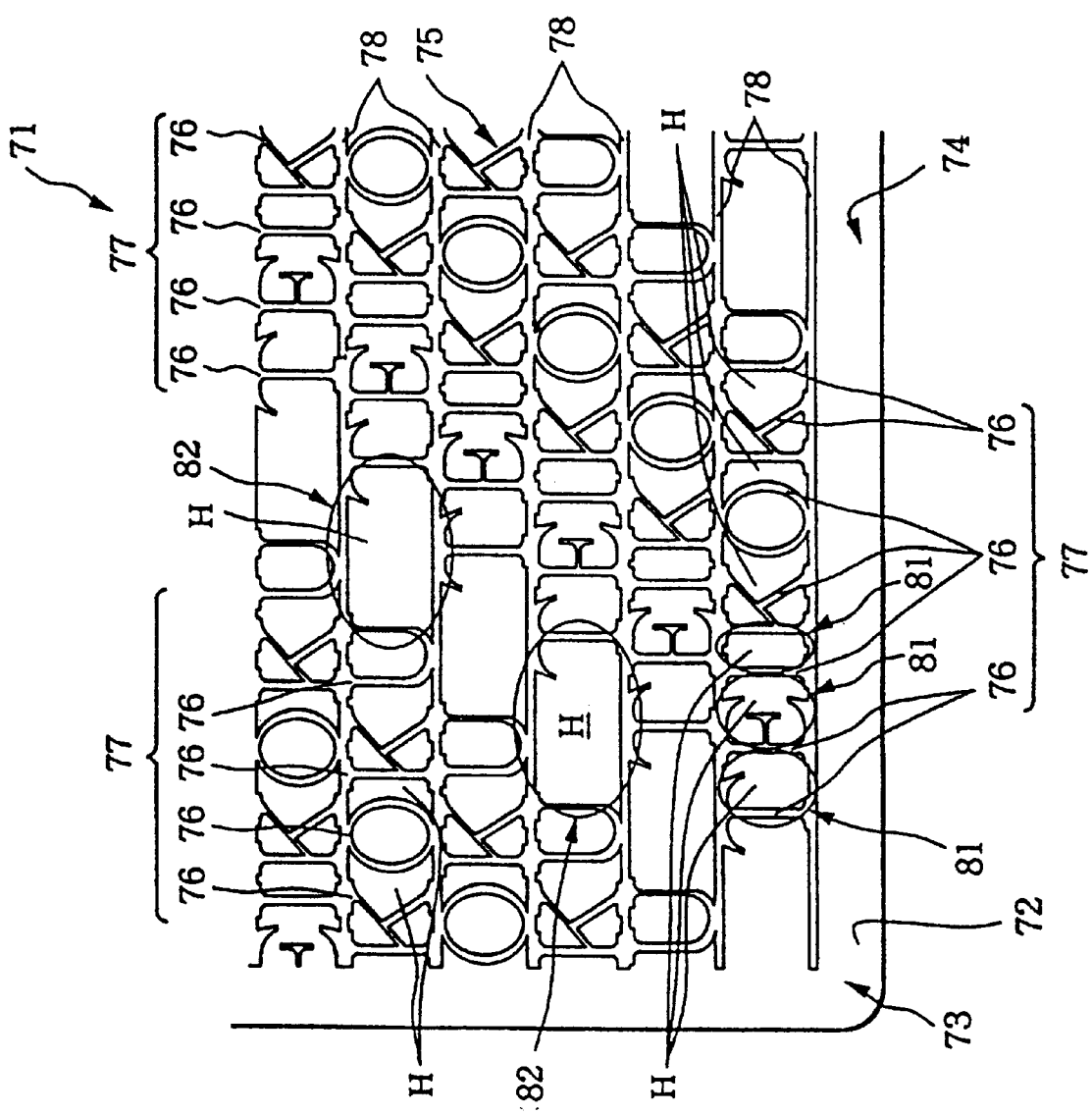
FIG. 9 is a diagram illustrating a reverse side of a mouse pad formed as in the case of the third embodiment.

An eighth embodiment of the present invention will be described below with reference to FIG. 9. FIG. 9 is a diagram showing the reverse side of a mouse pad 71 formed as in the case of the third embodiment. This embodiment will be described below with regard to only portions thereof in which the embodiment differs from the third embodiment. It should be noted that FIG. 9 shows the mouse pad 71 in a state where a release sheet as shown in the third embodiment has been peeled off.

The mouse pad 71, which is one example of application of the adhesive element according to this embodiment, has an adhesive part 75 formed on the reverse side of a substrate 72 of the mouse pad 71, exclusive of a corner 73 and a peripheral edge portion 74. The adhesive part 75 is formed from identification groups 77 and extensions 78. Each identification group 77 has identification portions 76 aligned in a row horizontally with respect to the mouse pad 71 as viewed in the figure. Each identification portion 76 has a letter of the alphabet formed from the above-described viscoelastic substance. The extensions 78 are formed from the viscoelastic substance so as to extend in the direction of the row of the identification portions 76 constituting each identification group 77. Further, the extensions 78 face each other vertically as viewed in the figure across the identification groups 77. The extensions 78 are contiguous with the identification portions 76. More specifically, the identification groups 77 are provided such that a plurality of identification groups 77 are spaced apart from each other in the direction of the row of the identification portions 76, and a plurality of identification groups 77 are disposed in a side-by-side relation to each other in parallel to the direction of the row of the identification portions 76. Further, an extension 78 is formed between each pair of identification groups 77 which are adjacent to each other vertically.

Thus, a sucker portion 81 is formed between each pair of adjacent identification portions 76 constituting each individual identification group 77. The sucker portion 81 has a surrounded area H that is surrounded by the pair of adjacent identification portions 76 and the extensions 78 that are contiguous with the two identification portions 76. Similarly, a sucker portion 82 is formed between each pair of adjacent identification groups 77 that are spaced apart from each other in the horizontal direction. The sucker portion 82 has a surrounded area H that is surrounded by the pair of adjacent identification groups 77 and the extensions 78 that are contiguous with the two identification groups 77.

The adhesive part 75 is formed as follows. The reverse side of the substrate 72 is coated with the above-described ultraviolet-curing, solvent-based or water-based coating ink by a printing method, e.g. screen printing, gravure, flexography, pad printing, offset printing (letterpress offset printing or wet offset printing), or letterpress printing, or a printing method using a roll coater or an emboss roll. Thereafter, the coated ink is fixed by irradiation with ultraviolet rays or heat-drying.

In this embodiment, arranged as stated above, the mouse pad 71 can be stuck fast to the top of a desk by a combination of the adhesive power of the adhesive part 75, which is made of a viscoelastic substance, and the suction force produced by the action of the surrounded areas H, which are formed by the sucker portions 81 and 82, respectively, when the sucker portions 81 and 82 are stuck fast to the top of the desk. Accordingly, the material cost of forming the adhesive part 75 can be reduced in comparison to a case where the viscoelastic substance is coated uniformly over the whole reverse side of the substrate 72, as in the case of the seventh embodiment. Moreover, it is possible to increase the holding power in comparison to a case where the viscoelastic substance is coated in a dot pattern as in the sixth embodiment. Accordingly, a mouse pad 71 having excellent holding power can be provided at reduced cost.

The adhesive part 75 of the mouse pad 71 is peeled from the desk by pulling the corner 73. At this time, the suction force produced by the surrounded areas H, which are surrounded with the sucker portions 81 and 82, can be made to disappear by allowing the air to enter the surrounded areas H. Accordingly, the mouse pad 71 can be peeled from the desk more easily than in a case where the viscoelastic substance is coated uniformly over the whole reverse side of the substrate 72.

The adhesive part 75, which is formed on the reverse side of the mouse pad 71, comprise identification groups 77, in each of which identification portions 76 formed in the shapes of letters of the alphabet are aligned in a row, and extensions 78 extending in the direction of the row of the identification portions 76 constituting each identification group 77. The extensions 78 face each other vertically across the identification groups 77. Therefore, if a firm's name, for example, is formed by the identification groups 77, the mouse pad 71 can be made distinguishable from other mouse pads, and advertising effect can be obtained. Furthermore, an extension 78 is provided between each pair of identification groups 77 extending parallel and adjacent to each other vertically such that the extension 78 extends in the direction of the row of the identification portions 76 so as to divide the two identification groups 77. Therefore, it is possible to clearly show the direction of the row of the identification portions 76 constituting each identification groups 77. Accordingly, it is possible to prevent such misconception that the identification portions 76, which are aligned in a row horizontally to constitute each identification group 77 representing a firm's name or the like, are mistakenly recognized to be aligned vertically.

Although in the above-described embodiment the identification portions 76 are formed from letters of the alphabet, it should be noted that the identification portions 76 are not necessarily limited to such letters. It is also possible to use numerals, symbols, patterns, etc. that enable discrimination and distinction from others. If the identification portions 76 are colored, it is possible to obtain distinguishing and advertising effects even more favorably.

9. Ninth Embodiment

Figure 10A:
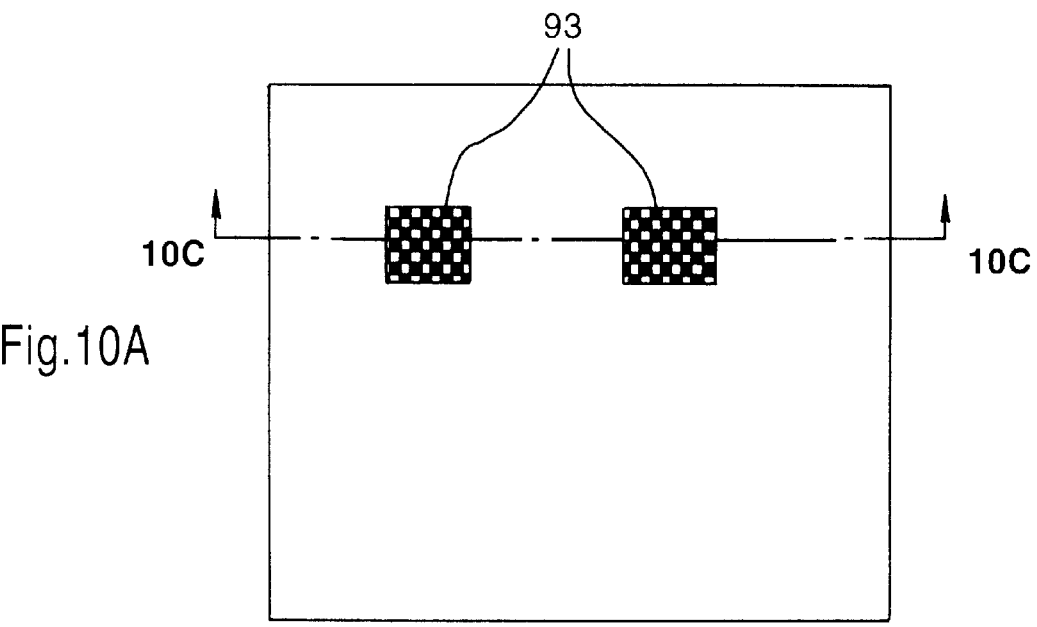
FIG. 10 is a diagram illustrating one example of an adhesive element having an image formed on an image reception layer and suckers on an adhesive layer.
Figure 10B:
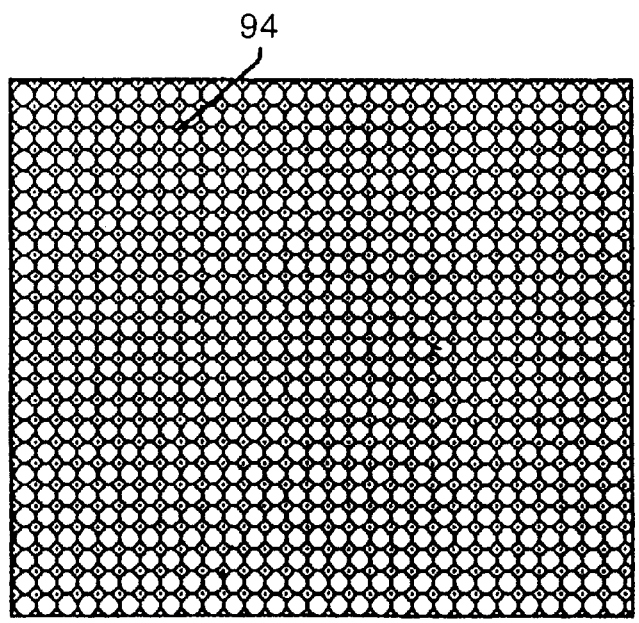
Figure 10C:
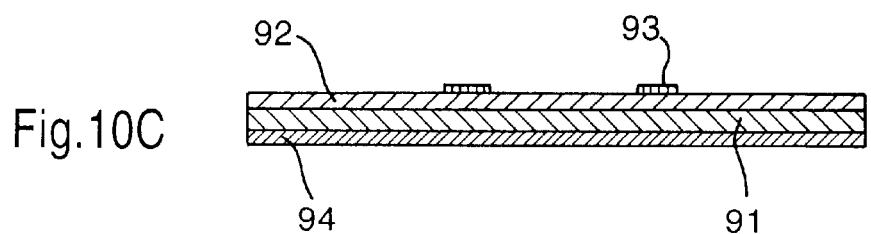

FIG. 10 is a diagram illustrating one example of an adhesive element in which an image is formed on a reception layer, and an adhesive layer has suckers.

Part (A) of FIG. 10 is a plan view of the adhesive element as seen from the reception layer side. Part (B) of FIG. 10 is a bottom view of the adhesive element as seen from a reverse side thereof on which a sucker layer is formed. Part (C) of FIG. 10 is a sectional view of the adhesive element taken along the line A—A in part (A) of FIG. 10.

A substrate 91 has a reception layer 92 formed thereon by using ink. The reception layer 92 has an ink image 93 formed thereon. The substrate 91 further has a sucker layer 94 formed on a side thereof reverse to the side thereof on which the reception layer 92 is formed. The sucker layer 94 is adapted to adhere to an object to which the adhesive element is to be stuck.

10. Tenth Embodiment

Figure 11A:
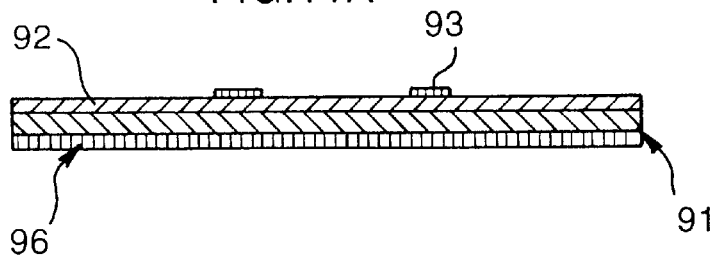
FIG. 11 is a diagram illustrating one example of an adhesive element having an image formed on an image reception layer and regular projections on an adhesive layer, in which part (A) is a sectional view of the adhesive element as seen from a section perpendicular to the surface of the image reception layer, and part (B) is a bottom view of the adhesive element as seen from a reverse side thereof on which the adhesive layer is formed.
Figure 11B:
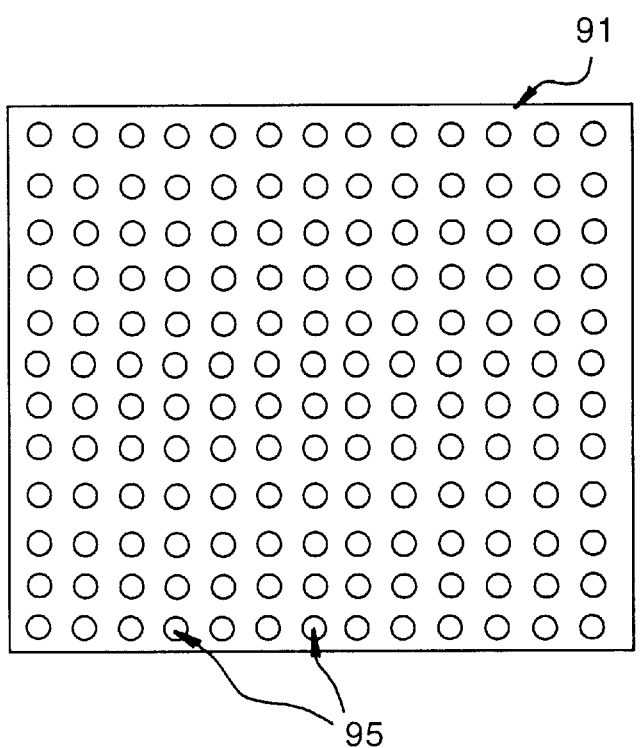
Figure 12:
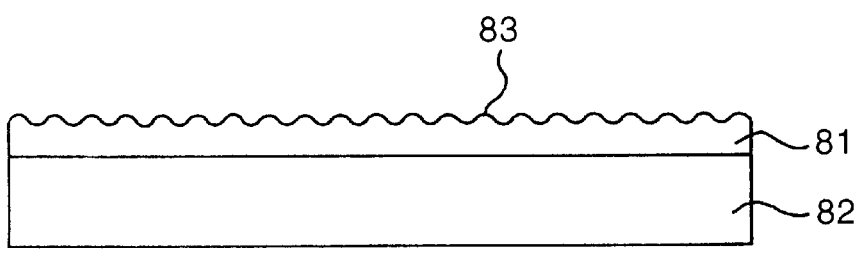
FIG. 12 is a diagram illustrating a conventional mouse pad having a pad layer.

FIG. 11 is a diagram illustrating one example of an adhesive element in which an image is formed on a reception layer, and an adhesive layer having regular projections is formed.

Part (A) of FIG. 11 is a sectional view of the adhesive element as seen from a section perpendicular to the surface of the reception layer, and part (B) of FIG. 11 is a bottom view of the adhesive element as seen from a reverse side thereof on which the adhesive layer is formed.

A substrate 91 has a reception layer 92 formed thereon. The reception layer 92 has an ink image 93 formed thereon by using ink. The substrate 91 further has an adhesive layer 96 having projections 95, which is formed on a side thereof reverse to the side on which the reception layer 92 is formed. The adhesive layer 96 is adapted to stick fast to an object to which the adhesive element is to be attached.

EXAMPLE 1

Formation of Reception Layer and Adhesive Layer

A polyester film having a thickness of 188 $\mu$m was used as a substrate. On one side of the film, a reception layer was formed by using a reception layer forming composition having the following chemical composition.

Reception layer forming composition:

| | |
|---|---|
| Polyurethane resin beads (average particle diameter: 25 $\mu$m) | 25 g |
| Ketone solvent (cyclohexanone) | 10 g |
| Aromatic hydrocarbon solvent (Cactus Solvent P150, manufactured by Cactus Oil Co., Ltd.) | 20 g |
| Polyester resin (Byron 200, manufactured by Toyo Spinning Co., Ltd.) | 30 g |
| Titanium oxide pigment (Tipaque R670, manufactured by Ishihara Sangyo Kaisha, Ltd.) | 35 g |
| Silicone oil (Shinetsu Silicone KF96; manufactured by Shinetsu Chemical Industry Co., Ltd.) | 2 g |
| Surfactant (Fluorad FC-431, manufactured by Sumitomo 3M) | 3 g |

The reception layer forming composition was kneaded and then coated to the whole surface of the film as a substrate by using a screen printing plate (polyester gauze; 150 mesh) to form a coating layer having a thickness of 20 $\mu$m. Then, the coating layer was dried.

To a side of the film reverse to the side on which the reception layer was formed, an ultraviolet-curing ink (UVQVN-70425 special medium, manufactured by Teikoku Ink Mfg. Co., Ltd.) was coated by using a screen printing plate made for sucker formation. Then, the coated ink was irradiated with ultraviolet rays to form an adhesive layer having suckers whose thickness after cure was 15 $\mu$m Evaluation of Reception Layer Characteristics After a plastic film had been stuck on the adhesive layer as a release sheet, a color image was formed on the surface of the reception layer by a xerographic color copying machine (Acolor 620, manufactured by Fuji Xerox Co., Ltd.). The color image was compared with an image formed on special paper for color copying machines in terms of gloss (glare), the softness of the image, resolution, color reproduction, etc., and evaluated according to evaluation criteria shown below. Results of the evaluation are shown in Table 1.

[Evaluation Criteria]

Excellent:
An image equal to or better than the image formed on the special paper for color copying machines.

Good:
An image somewhat rough and slightly blurred in comparison to the image formed on the special paper for color copying machines.

No good:
An image rough and unsharp in comparison to the image formed on the special paper for color copying machines.

Evaluation of Mouse Pad Characteristics

The adhesive element having an image formed thereon was cut into a size of 180 mm in length and 220 mm in breadth. After the plastic film had been removed from the adhesive layer, the adhesive element was stuck to the top of a desk, and mouse characteristics were evaluated.

The adhesive element used as a mouse pad was compared with a commercially available mouse pad having a textile surface in terms of mouse pad characteristics, i.e. mouse rolling condition, the ease of positioning the pointer, the ease of moving the mouse and mouse rolling feeling by using a commercially available mouse (RA010110, manufactured by Ricoh Company Ltd.), and evaluated according to evaluation criteria shown below. Results of the evaluation are shown in Table 1.

[Evaluation Criteria]

Excellent:
A mouse pad equal to or better than the commercially available mouse pad.

Good:
A mouse pad somewhat inferior in mouse movement to the commercially available mouse pad.

No good:
A mouse pad considerably inferior to the commercially available mouse pad in the ease of positioning, the ease of moving the mouse and mouse rolling feeling.

Evaluation of Scuff Resistance of Surface of Mouse Pad

After the mouse had been moved 3,000 times in the same place on the mouse pad through a distance of 15 cm, the surface condition of the mouse pad was observed visually and evaluated according to evaluation criteria shown below. Results of the evaluation are shown in Table 1.

[Evaluation Criteria]

Excellent:

A mouse pad having no scuff on the surface and no change in the surface.

Good:

A mouse pad having no scuff on the surface, but in which the surface where the mouse had moved changed as a whole.

No good:

A mouse pad having plain scuff on the surface.

EXAMPLE 2

A mouse pad was produced in the same way as in Example 1 except that a reception layer forming composition shown below was used to form a reception layer. Characteristics of the mouse pad were evaluated as in the case of Example 1. Results of the evaluation are shown in Table 1.

Reception layer forming composition:

| | |
|---|---|
| Polyurethane resin beads (average particle diameter: 25 μm) | 25 g |
| Vinyl caprolactam | 22 g |
| Tripropylene glycol diacrylate | 22 g |
| Bifunctional urethane acrylate oligomer (Ebecryl 285, manufactured by Daicel UCB) | 30 g |
| Acetophenone photo-initiator (Darocure 1116, manufactured by Merck & Co., Inc.) | 8 g |
| Titanium white pigment (Tipaque R670, manufactured by Ishihara Sangyo Kaisha, Ltd.) | 20 g |
| Silicone oil (Shinetsu Silicone KF96; manufactured by Shinetsu Chemical Industry Co., Ltd.) | 2 g |
| Surfactant (Fluorad FC-431, manufactured by Sumitomo 3M) | 3 g |

COMPARATIVE EXAMPLE 1

A mouse pad was produced in the same way as in Example 1 except that polyurethane resin beads having an average particle diameter of 2 μm were mixed in the reception layer forming composition. Characteristics of the mouse pad were evaluated as in the case of Example 1. Results of the evaluation are shown in Table 1.

COMPARATIVE EXAMPLE 2

A mouse pad was produced in the same way as in Example 1 except that polyurethane resin beads having an average particle diameter of 60 μm were mixed in the reception layer forming composition. Characteristics of the mouse pad were evaluated as in the case of Example 1. Results of the evaluation are shown in Table 1.

EXAMPLE 3

A mouse pad was produced in the same way as in Example 1 except that an ultraviolet-curing adhesive layer forming composition shown below was coated uniformly over the whole area of a side of the substrate reverse to the side on which the reception layer was formed so that the thickness after cure was 15 μm by screen printing using a T-200 mesh screen plate, and thereafter, the coated composition was cured by irradiation with ultraviolet rays of 500 mJ/m$^2$ in intensity to form an adhesive layer.

Adhesive layer forming composition:

| | |
|---|---|
| Urethane acrylate (Photomer 6210, manufactured by Sun Nopco) | 50 parts by weight |
| Epoxy monomer (Ebecryl 111, manufactured by Daicel UCB) | 10 parts by weight |
| Ester monomer (tripropylene glycol diacrylate) | 25 parts by weight |
| Acetophenone photo-initiator (Darocure 1116, manufactured by Merck & Co., Inc.) | 4 parts by weight |
| Acylphosphine oxide | 4 parts by weight |
| Elastomer (Asaplene T431, manufactured by Asahi Chemical Industry Co., Ltd.) | 5 parts by weight |
| Antifoaming agent (BYK052, manufactured by Bic Chemy) | 2 parts by weight |
| Polymerization inhibitor (MQ, manufactured by Kawaguchi Chemical Industry Co., Ltd.) | 0.1 part by weight |

The adhesive side of the mouse pad thus obtained was stuck to the top of a desk, and a mouse was moved thereon. The mouse pad did not slide undesirably together with the movement of the mouse.

An operation was repeated in which the adhesive side of the mouse pad was stuck to the surface of a glass plate and then peeled therefrom. Even after the operation had been repeated ten thousand times, the mouse pad exhibited excellent adhering-peeling characteristics. In addition, the surface to which the mouse pad was repeatedly stuck was stained only slightly. That is, adhesive transfer was small.

Furthermore, because the adhesive layer forming composition in the present invention is applied by using printing technique, it is coated uniformly and accurately to a predetermined position and then fixed to form an adhesive layer. Therefore, the adhesion of the adhesive layer to the top of a desk is improved in comparison to a case where the adhesive layer is not uniformly formed.

In addition, when the adhesive layer forming composition is applied by screen printing, it can be coated thicker than in a case where the composition is applied by other printing method. Accordingly, a thick adhesive layer can be formed. In this case, the adhesion of the adhesive layer to the top of a desk can be enhanced by pressing the adhesive layer against the top of the desk. If the adhesive layer is formed such that a part of the peripheral edge portion of the substrate is not covered with the adhesive layer, the mouse pad can be peeled off easily even if the adhesive strength of the adhesive layer is increased.

EXAMPLE 4

A mouse pad was produced in the same way as in Example 1 except that a repeating pattern-shaped adhesive layer was formed on a side of the substrate reverse to the side on which the reception layer was formed, by using UVQVN-70425 special medium ink, manufactured by Teikoku Ink Mfg. Co., Ltd.

The image formed on the reception layer and characteristics of the mouse pad were evaluated as in the case of Example 1. Results of the evaluation are shown in Table 1.

EXAMPLE 5

A mouse pad was produced in the same way as in Example 1 except that a repeating pattern-shaped adhesive layer was formed on a side of the substrate reverse to the side on which the reception layer was formed, by using an ultraviolet-curing ink (UVQVN-70425 special medium, manufactured by Teikoku Ink Mfg. Co., Ltd) as in the case of Example 4.

The image formed on the reception layer and characteristics of the mouse pad were evaluated as in the case of Example 1. Results of the evaluation are shown in Table 1.

EXAMPLE 6

An adhesive layer having a thickness of 15 μm was formed on 50% of the whole area of a side of the substrate reverse to the side on which the reception layer was formed, by screen printing in the same way as in Example 5 except that an adhesive layer forming composition shown below was used.

Adhesive layer forming composition:

| | |
|---|---|
| Urethane diacrylate (Ebecryl 230, manufactured by Daicel UCB) | 35 parts by weight |
| Monofunctional monomer (compound represented by the following formula 2) | 59 parts by weight |

$$H_2C=CH-\underset{O}{\overset{\parallel}{C}}-O-(C_2H_4O)_2-\text{Ph}-\underset{CH_3}{\overset{CH_3}{C}}-\text{Ph} \quad \text{Formula 2}$$

| | |
|---|---|
| Acetophenone photo-initiator (Darocure 1116, manufactured by Merck & Co., Inc.) | 4 parts by weight |
| Silicone oil (Shinetsu Silicone KF96, manufactured by Shin-etsu Chemical Industry Co., Ltd.) | 2 parts by weight |
| Auxiliary (silicone oil) | 1.0 part by weight |

Even after the mouse pad had been stuck to and peeled from the surface of a glass plate ten thousand times, the mouse pad exhibited excellent adhering-peeling characteristics. In addition, the surface to which the mouse pad was repeatedly stuck was stained only slightly (i.e. adhesive transfer was small). The image formed on the reception layer and characteristics of the mouse pad were evaluated as in the case of Example 1. Results of the evaluation are shown in Table 1.

COMPARATIVE EXAMPLE 3

A mouse pad was produced in the same way as in Example 3 except that polyurethane resin beads having an average particle diameter of 2 μm were mixed in the reception layer forming composition. Characteristics of the mouse pad were evaluated as in the case of Example 1. Results of the evaluation are shown in Table 1.

COMPARATIVE EXAMPLE 4

A mouse pad was produced in the same way as in Example 3 except that polyurethane resin beads having an average particle diameter of 60 μm were mixed in the reception layer forming composition. Characteristics of the mouse pad were evaluated as in the case of Example 1.

Results of the evaluation are shown in Table 1.

TABLE 1

| | Evaluation of image | Scuff resistance of surface | Mouse rolling condition |
|---|---|---|---|
| Example 1 | Excellent | Good | Excellent |
| Example 2 | Excellent | Excellent | Excellent |
| Example 3 | Excellent | Good | Excellent |
| Example 4 | Excellent | Good | Excellent |
| Example 5 | Excellent | Excellent | Excellent |
| Example 6 | Excellent | Excellent | Excellent |
| Comp. Ex. 1 | Good | Good | No good |
| Comp. Ex. 2 | No good | No good | Good |
| Comp. Ex. 3 | Good | Good | No good |
| Comp. Ex. 4 | No good | No good | Good |

As has been described above, the adhesive element according to the present invention allows the obverse side of the substrate to be printed with ink and also makes it possible to form a desired image, e.g. a photograph, pattern or characters, on the obverse side of the substrate by using an ink-jet printer, an electrophotographic printer, or a copying machine. In use of the adhesive element, it can be releasably secured to an object, e.g. a window glass, the top of a desk, an electric appliance such as an electric refrigerator, by sticking fast to the object the adhesive part, which is formed on the reverse side of the substrate from a viscoelastic substance.

The adhesive element having an image formed thereon can also be used as a releasably adherable printed matter, e.g. a poster or a label.

Furthermore, because the reception layer contains particles, the surface of the reception layer has high wear resistance and provides an excellent sliding surface. Therefore, the adhesive element according to the present invention can be used as a mouse pad and is also usable as a desk mat, a tablecloth, etc.

In particular, because a mouse pad thinner than conventional mouse pads can be obtained, it is possible to prevent tilting of a keyboard when placed on the mouse pad.

What we claim is:

1. An adhesive element comprising: a substrate; an image reception layer for an image, said image reception layer being formed on an obverse side of the substrate, the image reception layer and the substrate being made of different materials; and an adhesive part formed on a reverse side of said substrate, said adhesive part releasably adhering to an object to which said adhesive element is releasably stuck; wherein said adhesive part comprises one of a releasable tacky layer and a releasable viscoelastic layer, wherein said releasable tacky layer or releasable viscoelastic layer has suckers to adhere to a surface by creating a pressure difference, formed by screen printing, wherein said releasable tacky layer or releasable viscoelastic layer comprises a cured ionizing radiation-curing composition which is a liquid composition containing a mono functional monomer represented by the following formula 1 and a urethane acrylate oligomer,

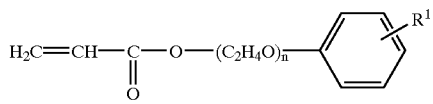

Formula 1 where n is an integer of from 1 to 5, and $R^1$ is a hydrocarbon residue having from 1 to 15 carbon atoms.

2. An adhesive element according to claim 1, wherein $R^1$ in formula 1 is a hydrocarbon residue having from 6 to 9 carbon atoms.

3. An adhesive element according to claim 1, wherein said urethane acrylate oligomer is a urethane diacrylate oligomer.

4. An adhesive element according to claim 2, wherein said urethane acrylate oligomer is a urethane diacrylate oligomer.

* * * * *